United States Patent
Stowe, II et al.

(10) Patent No.: US 6,703,351 B2
(45) Date of Patent: Mar. 9, 2004

(54) WATER-BASED DRILLING FLUIDS USING LATEX ADDITIVES

(75) Inventors: Calvin Joseph Stowe, II, Bellaire, TX (US); Ronald G. Bland, Houston, TX (US); Dennis K. Clapper, Houston, TX (US); Tao Xiang, Houston, TX (US); Saddock Benaissa, Sugar Land, TX (US)

(73) Assignee: Baker Hughes Incorporated, Houston, TX (US)

(*) Notice: Subject to any disclaimer, the term of this patent is extended or adjusted under 35 U.S.C. 154(b) by 148 days.

(21) Appl. No.: 09/785,842

(22) Filed: Feb. 16, 2001

(65) Prior Publication Data

US 2002/0160919 A1 Oct. 31, 2002

Related U.S. Application Data

(60) Provisional application No. 60/211,162, filed on Jun. 13, 2000.

(51) Int. Cl.$^7$ .............................. C09K 7/02; E21B 33/13
(52) U.S. Cl. ...................... 507/117; 507/117; 507/118; 507/119; 507/120; 507/125; 166/295
(58) Field of Search ................. 507/117, 118, 507/119, 120, 125; 166/295

(56) References Cited

U.S. PATENT DOCUMENTS

| 2,809,179 | A | * | 10/1957 | Endres | ................ | 507/119 |
|---|---|---|---|---|---|---|
| 3,724,547 | A | | 4/1973 | Bott | | |
| 3,730,271 | A | | 5/1973 | Gall | | |
| 3,780,806 | A | | 12/1973 | Bott | | |
| 5,164,433 | A | * | 11/1992 | Ricci et al. | .................. | 524/47 |
| 5,346,011 | A | * | 9/1994 | Onan et al. | .................. | 166/295 |
| 6,234,251 | B1 | * | 5/2001 | Chatterji et al. | ............ | 166/295 |
| 6,328,106 | B1 | * | 12/2001 | Griffith et al. | .............. | 166/295 |
| 6,401,817 | B1 | * | 6/2002 | Griffith et al. | .............. | 166/295 |

FOREIGN PATENT DOCUMENTS

| EP | 0175412 A2 | 3/1986 |
|---|---|---|
| GB | 2074636 A | 11/1981 |
| GB | 2131067 A | 6/1984 |
| GB | 2304754 A | 3/1997 |
| GB | 2351986 A | 1/2001 |

* cited by examiner

Primary Examiner—Philip C. Tucker
(74) Attorney, Agent, or Firm—Madan, Mossman & Sriram, P.C.

(57) ABSTRACT

A water-based drilling fluid having a polymer latex capable of providing a deformable latex film on at least a portion of a subterranean formation has been discovered to provide reduced drilling fluid pressure invasion when used to drill in shale formations for hydrocarbon recovery operations. A precipitating agent such as a silicate or an aluminum complex (e.g. sodium aluminate) is preferably used in conjunction with the polymer. Typically, the water present contains a salt to form a brine, often to saturation, although the invention may be practiced with fresh water. If a salt is employed, it is often helpful to additionally employ a surfactant, such as a betaine, for example.

33 Claims, 9 Drawing Sheets

Effects of latex on mud properties in 9.6 lb/gal 20% NaCl fluid after 16 hour, 250°F hot roll. Base: 20% NaCl / 1 lb/bbl XAN-PLEX® D/ 0.4 lb/bbl NEW-DRILL® PLUS / 2 lb/bbl BIO-PAQ® / 5 lb/bbl EXP-154 / 10 lb/bbl MIL-CARB® /27 lb/bbl Rev Dust Effects of latex on mud properties in 12 lb/gal fluid after hot rolling for 16 hours, at 250°F. Base: 20% NaCl / 0.75 lb/bbl XAN-PLEX® D/ 0.4 lb/bbl NEW-DRILL® PLUS / 3 lb/bbl BIO-PAQ®/ 5 lb/bbl EXP-154 / 150 lb/bbl MIL-BAR® /27 lb/bbl Rev Dust

WATER-BASED DRILLING FLUIDS USING LATEX ADDITIVES

This application claims the benefit of Provisional application Ser. No. 60/211,162 filed Jun. 13, 2000.

FIELD OF THE INVENTION

The present invention relates to water-based drilling fluids used during petroleum recovery operations, and more particularly relates, in one embodiment, to using water-based drilling fluids containing additives to inhibit penetration of the borehole wall by the fluid.

BACKGROUND OF THE INVENTION

Drilling fluids used in the drilling of subterranean oil and gas wells as well as other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids".

Drilling fluids are typically classified according to their base material. In water-based muds, solid particles are suspended in water or brine. Oil can be emulsified in the water or brine. Nonetheless, the water is the continuous phase. Oil-based muds are the opposite. Solid particles are suspended in oil and water or brine is emulsified in the oil and therefore the oil is the continuous phase. Oil-based muds that are water-in-oil emulsions are also called invert emulsions. Brine-based drilling fluids, of course are a water-based mud in which the aqueous component is brine.

Optimizing high performance water base mud design is commonly at the forefront of many drilling fluid service and oil operating companies' needs due to the various limitations of invert emulsion fluids. Invert emulsion fluids formulated with traditional diesel, mineral or the newer synthetic oils are the highest performing drilling fluids with regard to shale inhibition, borehole stability, and lubricity. Various limitations of these fluids, however, such as environmental concerns, economics, lost circulation tendencies, kick detection, and geologic evaluation concerns maintains a strong market for high performance water based fluids. Increased environmental concerns and liabilities continue to create an industry need for water based drilling fluids to supplement or replace the performance leading invert emulsion mud performance.

A particular problem when drilling into shale formations with water-based fluids is the pore pressure increase and swelling from penetration of the shale by the fluid. Shale stabilizers are typically added to the mud to inhibit these phenomena and to stabilize the shale from being affected by the mud.

Reducing drilling fluid pressure invasion into the wall of a borehole is one of the most important factors in maintaining wellbore stability. It is recognized that sufficient borehole pressure will stabilize shales to maintain the integrity of the borehole. When mud or liquid invades the shale, the pressure in the pores rises and the pressure differential between the mud column and the shale falls. With the drop in differential pressure, the shale is no longer supported and can easily break off and fall into the well bore. Likewise, the invasion of water into the shale matrix increases hydration or wetting of the partially dehydrated shale body causing it to soften and to lose its structural strength. Chemical reactivity can also lead to instability. There is always a need for a better composition and method to stabilize the shale formations.

It is apparent to those selecting or using a drilling fluid for oil and/or gas exploration that an essential component of a selected fluid is that it be properly balanced to achieve all of the necessary characteristics for the specific end application. Because the drilling fluids are called upon to do a number of tasks simultaneously, this desirable balance is difficult to achieve.

It would be desirable if compositions and methods could be devised to aid and improve the ability of drilling fluids to simultaneously accomplish these tasks.

SUMMARY OF THE INVENTION

Accordingly, it is an object of the present invention to provide methods to stabilize shale formations when drilling with water-based drilling fluids.

It is another object of the present invention to provide water-based drilling fluids that reduce the rate of drilling fluid pressure invasion into the borehole wall.

Still another object of the invention is to provide a composition and method that increase the pressure blockage, reliability, magnitude, and pore size that can be blocked with water-based fluids for stabilizing shale formations.

In carrying out these and other objects of the invention, there is provided, in one form, a water-based drilling fluid including water and a polymer latex capable of providing a deformable latex film or seal on at least a portion of a subterranean formation.

DETAILED DESCRIPTION OF THE INVENTION

Figure 1:
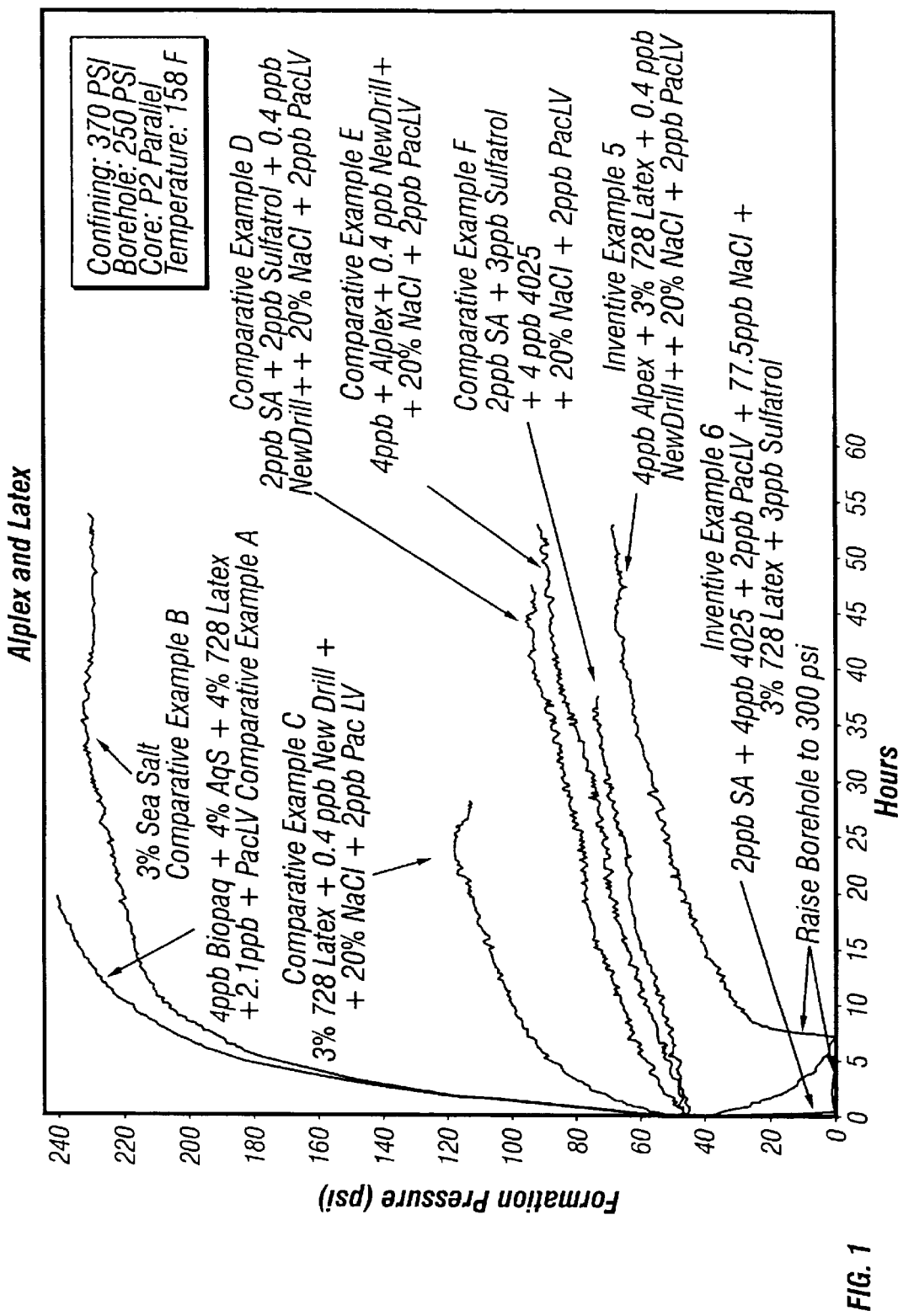
FIG. 1 shows a chart of the formation pressure as a function of time for a pressure invasion test using various intermediate test formulations.

It has been discovered that a polymer latex added to a water-based drilling fluid can reduce the rate the drilling fluid pressure invades the borehole wall of a subterranean formation during drilling. The polymer latex preferably is capable of providing a deformable latex film or seal on at least a portion of a subterranean formation. Within the context of this invention, the terms "film" or "seal" are not intended to mean a completely impermeable layer. The seal is considered to be semi-permeable, but nevertheless at least partially blocking of fluid transmission sufficient to result in a great improvement in osmotic efficiency. In a specific, non-limiting embodiment, a submicron polymer latex added to a high salt water-based mud containing an optional, but preferred combining/precipitating agent, such as an aluminum complex will substantially reduce the rate of mud pressure penetration into shale formations. The pressure blockage, reliability, magnitude and pore size that can be blocked are all increased by the latex addition. Inhibiting drilling fluid pressure invasion into the wall of a borehole is one of the most important factors in maintaining wellbore stability.

The essential components of the water-based drilling fluids of this invention are the polymer latex and water, which makes up the bulk of the fluid. Of course, a number of other common drilling fluid additives may be employed as well to help balance the properties and tasks of the fluid.

The polymer latex is preferably a carboxylated styrene/butadiene copolymer, in a non-limiting example. A particular, non-limiting carboxylated styrene/butadiene copolymer is GENCAL 7463 available from Omnova Solution Inc. Other suitable polymer latexes include, but are not limited to polymethyl methacrylate, polyethylene, polyvinylacetate copolymer, polyvinyl acetate/vinyl chloride/ethylene copolymer, polyvinyl acetate/ethylene copolymer, natural latex, polyisoprene, polydimethylsiloxane, and mixtures thereof. A somewhat less preferred polymer latex is polyvinylacetate copolymer latex, more specifically, an ethylenevinyl chloride vinylacetate copolymer. While polyvinylacetate copolymer latices will perform within the methods of this invention, they generally do not perform as well as the carboxylated styrene/butadiene copolymers. The average particle size of the polymer latex is preferably less than 1 micron or submicron and most preferably having a diameter of about 0.2 microns or 0.2 microns or less. Other polymers in the disperse phase may be found to work. It is anticipated that more than one type of polymer latex may be used simultaneously. The proportion of the polymer latex in the drilling mud, based on the total amount of the fluid may range from about 0.1 to about 10 vol. %, preferably from about 1 to about 8 vol. %, and most preferably from about 2 to about 5 vol. %.

The optional salt may be any common salt used in brine-based drilling fluids, including, but not necessarily limited to calcium chloride, sodium chloride, potassium chloride, magnesium chloride, calcium bromide, sodium bromide, potassium bromide, calcium nitrate, sodium formate, potassium formate, cesium formate and mixtures thereof. By a "high salt content" is meant at least 20 weight percent, and saturated brine solutions are preferred in one non-limiting embodiment. It will appreciated that it is impossible to predict in advance what the salt content of a particular saturated brine solution will be since the saturation point depends on a number of factors including, but not limited to the kinds and proportions of the various components of the water-based fluid. The salt is optional because the invention will perform without it, that is, using fresh water.

Another optional component is precipitating agent. Suitable precipitating agents include, but are not limited to, silicates, aluminum complexes, and mixtures thereof. Suitable aluminum complexes include, but are not limited to, sodium aluminate, $NaAl_2O_2$, sometimes written as $Na_2OAl_2O_3$, aluminum hydroxide, aluminum sulfate, aluminum acetate, aluminum nitrate, potassium aluminate, and the like, and mixtures thereof (especially at pH of >9 for these compounds to be soluble in water). The proportion of the precipitating agent in the drilling mud, based on the total amount of the fluid may range from about 0.25 to about 20 lb/bbl, preferably from about 1 to about 10 lb/bbl and most preferably from about 2 to about 7 lb/bbl. Without being limited to a particular theory, the precipitating agent is believed to chemically bound to the surface of the clay of the borehole and provide a highly active polar surface.

Another optional component of the composition of the invention is a surfactant. If the surfactant is present, the surfactant treated latex wets the surface strongly and accumulates to form a film or coating that seals fractures and defects in the shale. Suitable wetting surfactants include, but are not limited to, betaines, alkali metal alkylene acetates, sultaines, ether carboxylates, and mixtures thereof. It has been determined that surfactants are particularly beneficial when salts are present in the drilling fluid, and are not as preferred in fresh water fluid systems.

The proportions of these components based on the total water-based drilling fluid are from about 0.1 to 10 volume % of polymer latex, at least 1 wt % of salt (if present), from about 0.25 to 20 lb/bbl of precipitating agent (if present), from about 0.005 to about 2 vol. % of surfactant (if present), the balance being water. In a more preferred embodiment, the proportions range from about 1 to 8 vol. % of polymer latex, at least 1 wt % of salt (if present), from about 1 to 10 lb/bbl of precipitating agent (if present) from about 0.01 to about 1.75 vol. % of wetting surfactant (if present), the balance being water.

It is desired that the sodium aluminate or other precipitating agent be in a metastable form in the mud, which means that it is in suspension or solution, but precipitates out upon the borehole wall. Typically, aluminum compounds have been added to the mud on site. If added to mud formulations earlier, they tend to be unstable and precipitate prematurely.

Since the development of pore pressure transmission (PPT) testing, the effects of various chemical additives on pore pressure transmission rates have been evaluated. Testing has focused primarily on the performance of salts, glycols, and precipitating agents such as silicates and aluminum complexes. Improvements in PPT test equipment and methods have accompanied the general interest and search for increasing more efficient water-based mud systems that approach the PPT test performance of invert emulsion fluids. While other investigators have found silicate fluids to be especially effective for reduced poor pressure transmission rates, silicate fluids have not been widely used due to limitations of these fluids. Although lower pore pressure transmission rates have been demonstrated for salts, glycols, and aluminum complexing agents, these products still do not approach the performance of invert emulsion fluids.

A combination of a new formulation approach as well as modification to the PPT test procedure was used to demonstrate the efficacy of an alternative approach to enhance the performance of water-based mud systems. Water-dispersible polymers were selected to provide sources of small, deformable particles to provide a sealing and blocking effect on the shale. The first of these polymers was tested on the PPT test in a fluid with other products.

The invention will be further illustrated with respect to the following examples, which are only meant to further illuminate the invention, and not limit it in any way.

EXAMPLE 1

Fluid Intermediate Preparation

The following Example is the first preparation of the intermediate compositions of this invention. Unless otherwise noted, the latex in the Examples is 728 Latex, a polyvinylacetate latex.

| Component | Grams per barrel | Grams per 7 barrels |
|---|---|---|
| Tap water | 310 | 2170 |
| Sodium aluminate | 2 | 14 |
| LIGCO | 2 | 14 |
| AIRFLEX 728 | 10.5 | 73.5 (75 cc) |

The mixture was hot rolled. After 6 days, the pH was 11.51. The bottom of the jar was about 75% covered with 1/32" fines. The following components were then added, again given in gram proportions for a single barrel and 7 barrels, respectively:

| | | |
|---|---|---|
| NEWDRILL PLUS | 0.4 | 2.8 |
| NaCl (20%) | 77.5 | 540 |
| MILPAC LV | 2 | 14 |

The fluid with the latex and the NEWDRILL+ had a light brown color. LD8 was added to control foaming. The resulting mixture was hot rolled for four hours at 150° F. The final pH was 10.75.

EXAMPLE 2

Shale Pressure Penetration Determination

The pore pressure transmission (PPT) device is based on a 1500 psi Hassler cell designed for 2.5 cm diameter core plugs from 2.5 cm to 7.5 cm in length. A Hassler cell is a cylinder with a piston inserted in each end. The core is held between the two pistons. A rubber sleeve is placed around the core and the pistons to seal around the core and prevent flow around the core. The outside of the sleeve is pressured to make a good seal. These tests use a core 25 mm in diameter and 25 mm long.

The low pressure side of the core (formation side) is fitted with a 1 liter, 2000 psi., stainless steel accumulator to provide back pressure. The high pressure side of the core is connected to two similar accumulators, one for pore fluid, and one for the test fluid. The pressure in each accumulator is controlled with a manual regulator fed by a 2200 psi nitrogen bottle.

All pressures are monitored with Heise transducers. The transducer pressures are automatically computer logged at preset intervals.

The cell is enclosed in an insulated chamber and the temperature maintained with a 200 watt heater. The heater is controlled with a Dwyer temperature controller driving a Control Concepts phase angle SCR control unit. Temperature control is accurate to +/−0.05° C.

A pressure is applied to one end of the core and the flow through the core is measured. The piston on the low pressure side is filled with liquid, and blocked, so an increase in liquid pressure is measured rather than flow. A very small amount of liquid flow through the core will make a large rise in the pressure, making the cell sensitive enough to measure flow through shale. Shale has a very low permeability, so the flow of fluid through it is very small. Pressure is plotted versus time. Results are expressed as formation pressure (FP). If the FP increases over time, there is pressure penetration; if the formation pressure decreases over time there is not, and the latter is what is desired.

The fluid of Example 1 was used. Three 50% displacements of 50 cc each were performed during and just after heating up of the test cell. One run was started at 100% displacement and the temperature was difficult to control, so it was decided starting at 50% was better.

Temperature=155° F.

Borehole side pressure=250 psi

Confining pressure=370 psi

| Time, hours:minutes | Formation Pressure, psi |
|---|---|
| 0 | 48.1 |
| 1:30 | 47.9 |
| 2:00 | 47.6 |
| 7:15 | 50.9 |

Eventually, 50 cc of fluid was displaced up to 50% within 2° F. temperature variation. The pressure rose to 52.7 psi. Formation heat was turned off, and the temperature was 147° F. Displacement pulled the formation pressure down to 36 psi, then rose to 80.2 over the next two days. The initial formation pressure decrease demonstrated that the formulation of the invention inhibited pressure penetration.

EXAMPLE 3

Fluid Intermediate Preparation—Proportions in Grams Unless Otherwise Noted

| Component | Per barrel | Per 7 barrels |
|---|---|---|
| Tap water | 310 | 2170 cc |
| Sodium aluminate | 2 | 14 |
| LIGCO | 2 | 14 |
| AIRFLEX 728 Latex | 10.5 | 75 cc |
| NEWDRILL PLUS | 0.4 | 2.8 |
| NaCl (20%) | 77.5 | 540 |
| MILPAC LV | 2 | 14 |

The sodium aluminate and AIR FLEX 728 latex were mixed together and allowed to stand over the weekend. The mixture was then hot rolled at 150° F. for two hours. The salt and polymers were then added. The sequence of addition to the sodium aluminate/latex mixture was: PHPA (partially hydrolyzed polyacrylamide; NEWDRILL PLUS), followed by mixing; then half of the salt, followed by MILPAC LV, followed by the other half of the salt. The mixture was hot rolled overnight.

EXAMPLE 4

Shale Pressure Penetration Determination

Borehole side pressure=250 psi

Confining pressure=370 psi

| Time, hours:minutes | Formation Pressure, psi |
|---|---|
| 0 | 46.3 |
| 5:49 | 2.3 |
| 7:36 | 0.6* |
| 50:00 | 65.0 |

*The confining pressure was raised to 410 psi and the borehole pressure was raised to 300 psi at this point.

EXAMPLES 5 and 6, COMPARATIVE EXAMPLES A–F

Two other inventive formulations (Examples 5 and 6) and six comparative Examples (A–F) were prepared and tested. The results are shown in FIG. 1. As indicated the Inventive Examples 5 and 6 both gave the desired results of decreasing formation pressure over time. The comparative Examples undesirably gave increasing formation pressures over time. The composition identities are given on FIG. 1 itself. The designation "CORE: P2 PARALLEL" refers to the core being Pierre Shale in parallel orientation.

These results verify the necessity of having all three components: the salt, the latex, and the sodium aluminate (Examples 5 and 6). Use of the latex alone (comparative Ex. A), use of salt only (comparative Ex. B), use of the latex together with salt only (comparative Example C), use of sodium aluminate and the salt only (comparative Ex. D), use of the sodium aluminate and salt only (comparative Ex. E), and use of the sodium aluminate with salt only (comparative Ex. F) were all found to be ineffective, or at least certainly not as effective as the inventive composition.

Further experimental evidence indicates that some latex products exhibit a synergistic effect with aluminum complexes that results in improved pore pressure transmission characteristics. Stable drilling fluid systems have been formulated with latex that remain dispersed and flexible in highly saline (high salt content) fluids. Inventive drilling fluids provide pore pressure transmission performance closer to oil-based fluids than what is exhibited by current aluminum-based drilling fluids. Two features of this system are believed to be the main contributors to shale stabilization. First, the ultra-fine, deformable latex particles (having a preferable diameter of about 0.2 microns) mechanically seal shale micro-fractures and physically prevent further intrusion of drilling fluids into sensitive shale zones. Secondly, latex co-precipitation with precipitating agents, if present, such as aluminum complexes, produces a semi-permeable membrane on shale surfaces that chemically improves the osmotic efficiency between the fluid and the borehole.

Three experimental additives were discovered for the inventive fluids: EXP-153, EXP-154 and EXP-155. EXP-153 is a sulfonated polymer resin used to control HTHP fluid loss in this system. EXP-154 is considered an alternative to aluminum complex product ALPLEX. Compared to ALPLEX, EXP-154 exhibits much better compatibility with latex fluids. EXP-155 is a modified latex product. Compared to other commercially available latices EXP-155 displays less sensitivity to electrolytes and does not flocculate in 20% sodium chloride fluids at temperatures up to 300° F. (149° C.). Furthermore, due to the wide temperature range between its glass transition temperature ($T_g$) and melting point ($T_m$), the particles of EXP-155 remain deformable and capable of plugging shale micro-fractures at most application temperatures. The toxicities of all of these products meet the requirement for fluid disposal in the Gulf of Mexico.

Formulations and Fluid Properties

All fluids were mixed according to established Baker Hughes INTEQ mixing procedures. The initial and final Bingham Plastic rheological properties of plastic viscosity, yield point, ten second gels, and ten minute gels were measured by Fann 35 viscometer at 120° F. (49° C.). The initial and final pH and API filtrate were recorded. HTHP fluid loss at 250° F. (121° C.) was measured after static and dynamic aging for 16 hours at 250° F. (121° C.).

Latex Stability

The stability of the latex samples were first evaluated in 20% and 26% NaCl solutions by the following procedure:
1. Add 332 ml 20% (or 26%) NaCl water solution into a mixer cup and start mixing.
2. Slowly add 18 ml tested latex sample into the solution and adjust the Prince Castle mixer to 4000 rpm with Variac and tachometer.
3. After stirring 5 minutes, slowly add 3 grams $NaAlO_2$ into the above solution and mix for a total of 20 minutes. During the mixing period it may be necessary to add about 5 drops defoamer (LD-8) if foaming is observed.
4. Put this fluid into a jar and statically age for 16 hours at 150° F. (66° C.).
5. Remove the jar from the oven and cool to room temperature. Observe the fluid for flocculation and separation.
6. If there is no separation or flocculation, sieve the fluid with a 100-mesh (0.150 mm) [please check this conversion, if possible] screen. Observe sieve for amount of retained latex particles.

Additional evaluations were performed only for those samples having passed the above screening test. A Malvern Mastersizer Particle Size Analyzer was used to measure the particles size distributions of latex in formulated fluids. The small sample dispersion unit and the standard refractive index 50HD (Particle R.I.=1.5295, 0.1000 and Dispersant R.I.=1.3300) were used in all of the particle size distribution tests. 20% NaCl water solution with pH adjusted to 11.5.

Shale Inhibition Test

The shale inhibition characteristics were determined by shale dispersion tests that included static wafer test, and pore pressure (PPT) tests. In the PPT test, a preserved Pierre II shale core, 1 inch diameter by 0.9 inch long (2.54 cm×2.29 cm long), is placed between two pistons, as described previously in Example 2. The circumference of the shale and pistons are sealed with a rubber sleeve. The plug is oriented with the bedding planes in the parallel or high permeability direction. Drilling fluid at 300 psi is displaced through the upstream piston (borehole side) and seawater at 50 psi is displaced through the downstream piston (formation side). The seawater in the downstream piston is contained with a valve. As mud filtrate enters the borehole end of the plug, connate water in the shale is displaced into the formation piston.

Latex Stability

As noted above, initial experiments indicated that some latex products (emulsion polymers) produced synergistic effects with an aluminum complex, resulting in improved pore pressure transmission characteristics of the fluids. This result revealed a new approach to the design of highly inhibitive, water-based fluids. However, latex is generally considered to be a metastable system. The large surface of the particles is thermodynamically unstable and any perturbation affecting the balancing forces stabilizing the polymer dispersion results in a change in the kinetics of particle agglomeration. Most commercial latices, which are designed for the production of synthetic rubber or the application of painting/coating, are sensitive to increasing electrolytic concentration and temperature.

Figure 2:
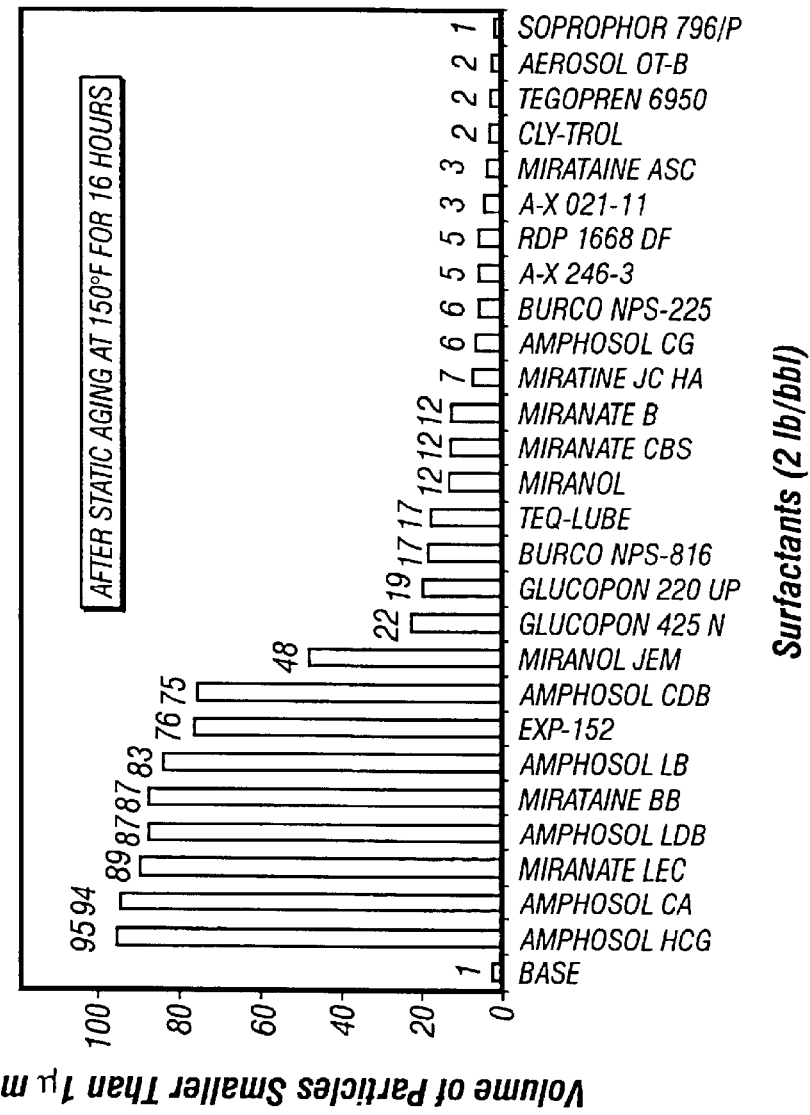
FIG. 2 is a graph of the surfactant effect on GENCAL 7463 particle size in 20% NaCl/1 lb/bbl NEWDRILL PLUS/1 lb/bbl XAN-PLEX D/0.5 lb/bbl sodium gluconate/3 lb/bbl NaAlO2/5% by volume GENCAL 7463.

As shown in Table I, among 16 latex samples tested in 26% and 20% NaCl solutions, none of them is stable in 26% NaCl and only AIRFLEX 728 and GENCAL 7463 are relatively stable in 20% NaCl. Clearly, for successful applications of latex in drilling fluids, latex stability in high salt environments and at elevated temperatures must be improved. A common technique used to increase latex stability in electrolyte solutions is the addition of some surfactants. FIG. 2 compares the effect of EXP-152 on the particle size distributions of AIRFLEX 728 with that of GENCAL 7463. These results indicate that a blend of GENCAL 7463 and EXP-152 may be a stable product for drilling fluid applications.

TABLE 1

Stability Test for Latex Products in NaCl Solution

| Ex. | Latex Samples | $T_g$ (° C.) | Stability After 16 Hours Static Aging | |
|---|---|---|---|---|
| | | | 26% NaCl/3 lb/bbl NaAlO$_2$ | 20% NaCl/3 lb/bbl NaAlO$_2$ |
| Vinyl Acetate/Ethylene Vinyl Chloride | | | | |
| 7 | AIRFLEX 728 | 0 | Flocculation but pass 100 mesh | Flocculation/Coagulation |
| Vinyl Acetate/Ethylene | | | | |
| 8 | AIRFLEX 426 | 0 | Flocculation/Coagulation | Flocculation/Coagulation |
| 9 | AIRFLEX 7200 | 0 | Flocculation/Coagulation | Flocculation/Coagulation |
| 10 | VINAC XX-211 | N/A | Flocculation/Coagulation | Flocculation/Coagulation |
| 11 | ELVACE 40722-00 | N/A | Flocculation/Coagulation | Flocculation/Coagulation |
| Carboxylated Styrene/Butadiene | | | | |
| 12 | GENCAL 7463 | 13 | Flocculation but pass 100 mesh | Floc. at 150° F. (66° C.) but stable at 75° F. (24° C.) |
| 13 | GENCAL 7470 | N/A | Flocculation/Coagulation | — |
| 14 | GENFLO 576 | N/A | Flocculation/Coagulation | — |
| 15 | TYLAC 68219 | N/A | Flocculation but pass 100 mesh | Flocculation but pass 100 mesh |
| 16 | TYLAC CPS 812 | N/A | Flocculation/Coagulation | — |
| 17 | TYCHEM 68710 | N/A | Flocculation/Coagulation | — |
| 18 | ROVENE 9410 | −56 | Coagulation | Coagulation |
| 19 | ROVENE 6140 | −27 | Coagulation | Coagulation |
| Carboxylated Acrylic Copolymer | | | | |
| 20 | SYNTHEMUL CPS 401 | N/A | Flocculation/Coagulation | — |
| 21 | SYNTHEMUL 97982 | N/A | Flocculation/Coagulation | — |
| Styrene/Butadiene | | | | |
| 22 | ROVENE 4823L | −51 | Coagulation | Coagulation |

Aluminum Complex

Although a synergistic effect of ALPLEX with latex on stabilizing shales was confirmed by PPT test results, this system is fragile and very sensitive to increasing salt concentration and temperature. It was found that in 20% NaCl solution, 3% AIRFLEX 728 or 3% GENCAL 7463 were flocculated in a few minutes by adding 4 lb/bbl ALPLEX. Prehydration of ALPLEX in fresh water or addition of some surfactant (e.g. EXP-152) did improve the stability of this system at low temperatures, but the latex particle size was still greatly influenced by ALPLEX. Those particles greater than 100 microns in the fluid containing ALPLEX may have partially resulted from insoluble lignite (a component of ALPLEX). A similar effect was also observed with GENCAL 7463. Poor solubility and slow dissolution rate of the lignite in high salt concentrations is probably the main factor contributing to decreased latex stability.

Figure 3:
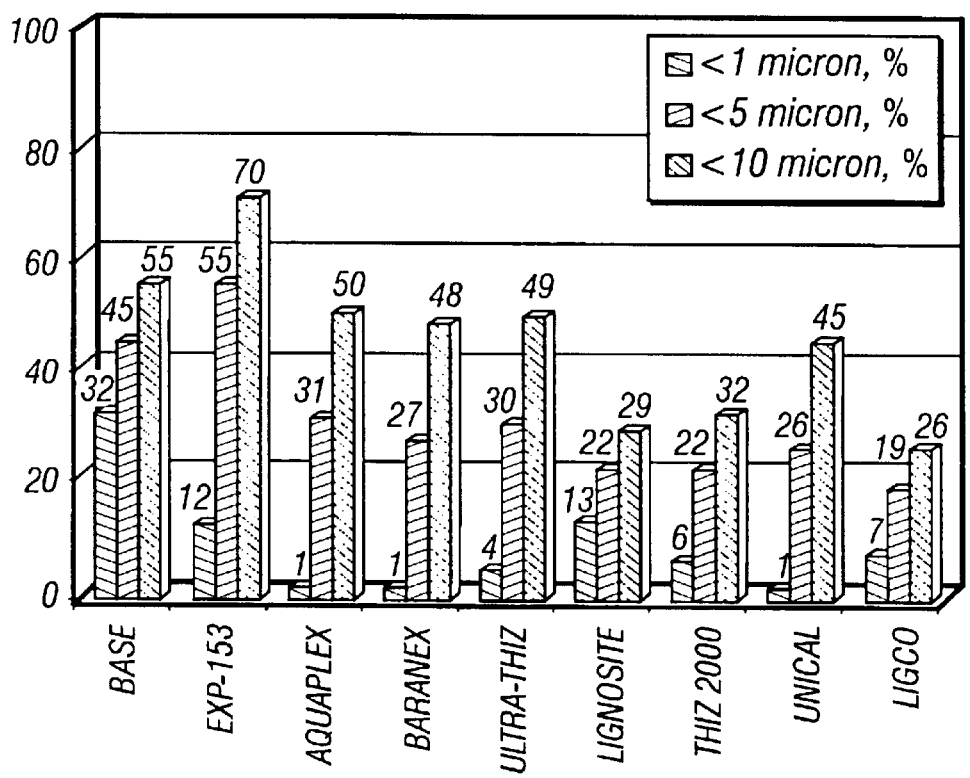
FIG. 3 is a graph of the influence of polymer resins (3 lb/bbl) on GENCAL 7463 particle size distributions after 16 hours, 150° F. hot roll in 20% NaCl/0.75 lb/bbl XAN-PLEX D/0.5 lb/bbl sodium D-gluconate/0.4 lb/bbl NEW-DRILL PLUS/2 lb/bbl BIO-PAQ/3 lb/bbl NaAlO$_2$/3% GENCAL 7463/1 lb/bbl EXP-152.

In order to find a polymer resin that was compatible with a latex system additional tests were performed. FIG. 3 shows the effects of different polymer resins on the particle size distributions of EXP-155. Among the tested samples, EXP-153 exhibited the best compatibility with this latex system.

Figure 4:
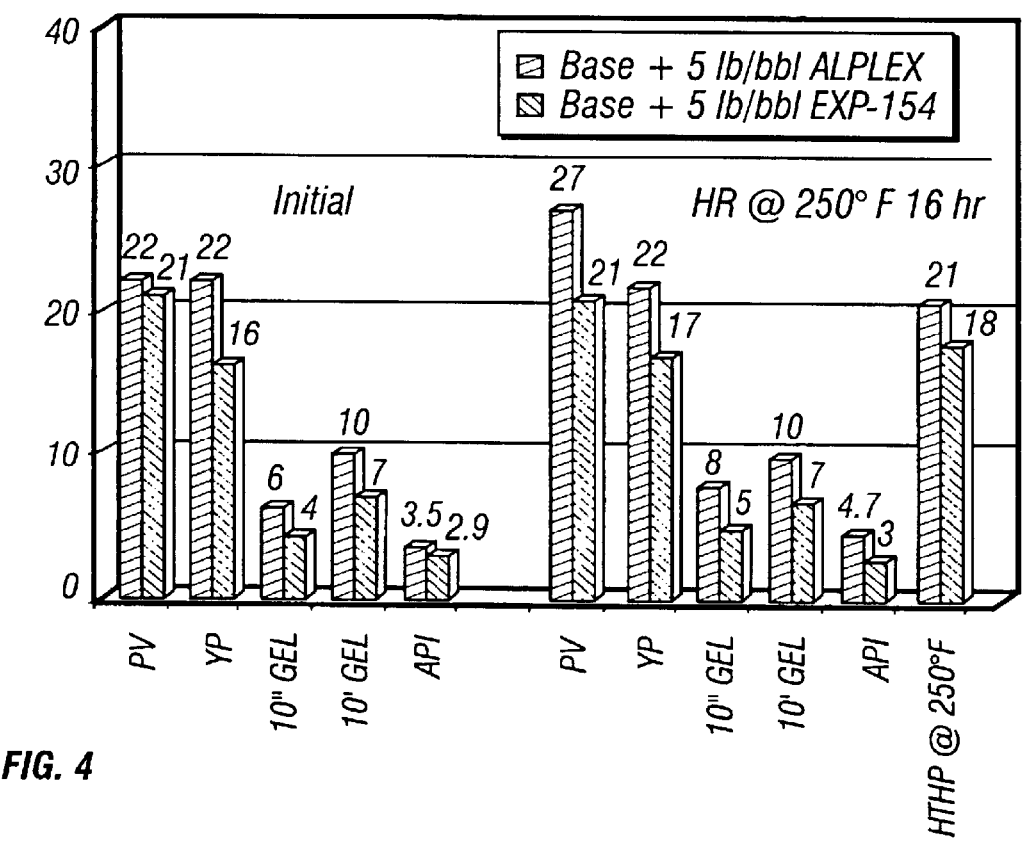
FIG. 4 is a graphical comparison of the effects on mud properties for EXP-154 versus ALPLEX in 12 lb/gal mud; the base mud was 20% NaCl/0.5 lb/bbl XAN-PLEX D/2 lb/bbl BIO-LOSE/1 lb/bbl NEW-DRILL PLUS/3% EXP-155/150 lb/bbl MIL-BAR/27 lb/bbl Rev Dust.

A new aluminum complex product, EXP-154 (a blend of 45% NaAlO$_2$, 45% EXP-153 and 10% sodium D-gluconate) was invented for the latex system. FIG. 4 compares the effects on the mud properties for EXP-154 with ALPLEX in 12 lb/gal 20% NaCl/NEW-DRILL/EXP-155 fluids. The experimental aluminum complex exhibits improved compatibility with latex and biopolymers. Additionally, EXP-154 is found to control filtration, both API and HTHP, better than does ALPLEX.

Pore Pressure Transmission Testing

Borehole stability effects of the experimental latex system were evaluated with the pore pressure transmission (PPT) tester previously described. A preserved Pierre II shale plug, 1 inch diameter by 0.9 inch long (2.54 cm×2.29 cm long), is placed between two pistons, as described previously in Example 2. The circumference of the shale and pistons sealed with a rubber sleeve. The plug is oriented with the bedding planes in the parallel or high permeability direction. Drilling fluid at 300 psi is displaced through the upstream piston (borehole side) and seawater at 50 psi is displaced through the downstream piston (formation side). The seawater in the downstream piston is contained with a valve. As mud filtrate enters the borehole end of the plug, connate water in the shale is displaced into the formation piston. This additional water compresses the water inside the piston causing the pressure to rise. The pressure increase in the formation piston water is measured as formation pressure (FP) rise.

Figure 5:
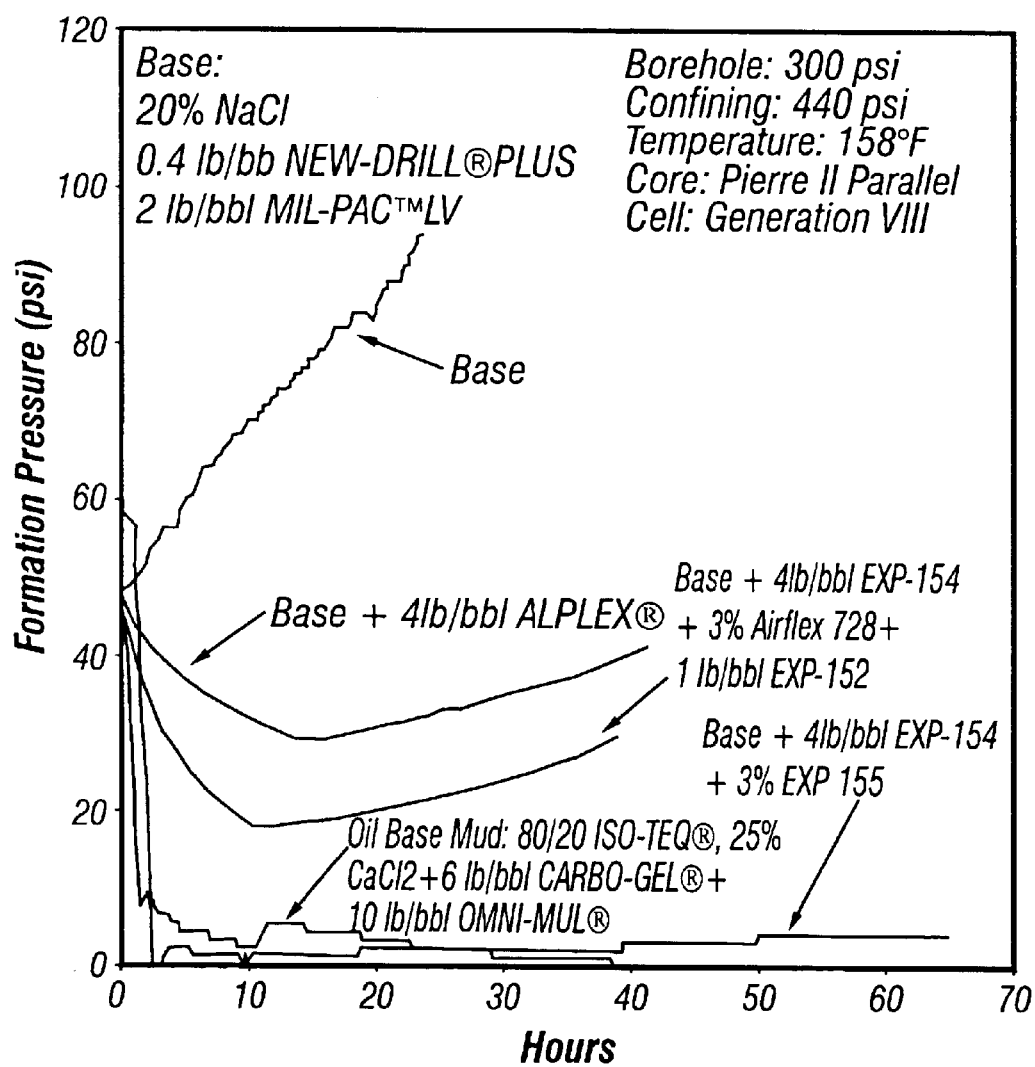
FIG. 5 is a graph of PPT test results for ALPLEX, EXP-154/EXP-155, and ISO-TEQ fluids.

The EXP-154/EXP-155 fluid produces the best PPT results to date as shown in FIG. 5. The top curve is a standard salt/polymer. The next one down is ALPLEX, the next curve is an EXP-154/AIRFLEX 728 formulation, below that is the EXP-154/EXP-155 formulation, and finally at the bottom is a 80/20 ISOTEQ fluid, 25% limited to one explanation, the superior performance of the EXP-154/EXP-155 fluid is believed to be due, at least in part, to its small particle size. As discussed previously, GENCAL 7463 was more efficiently dispersed by the EXP-152 resulting in a much greater percentage of particles smaller than one micron.

A synergistic effect between latex and aluminum complex has also been observed in these tests. Such results may be related to the co-precipitation behavior of EXP-155 and EXP-154. It was found that EXP-154 becomes insoluble at pH<10. At this condition, EXP-155 alone does not precipitate. However, when EXP-154 exists in this system, EXP-155 will be co-precipitated with EXP-154. Because of their co-precipitation behavior, deposited particles on the shale surface are comprised of lipophilic and hydrophilic components. This multiphase system is capable of creating a semi-permeable membrane, resulting in a great improvement in osmotic efficiency. Another characteristic of EXP-155 is that its ultra-fine particles are elastomer-like over a wide range of temperatures. When subjected to differential hydraulic pressure, these ultra-fine particles do not shear or break, but deform and penetrate the hairline fractures and to form an impermeable seal. At the temperatures between $T_g$ (glass transition temperature) and $T_m$ (melting point), most polymers will exhibit rubber-like elasticity. The glass transition temperature of EXP-155 is 52° F. From the relationship between $T_g$ and $T_m$ plotted by Boyer, 1963, reproduced in Billmeyer, Textbook of Polymer Science, Second Edition, Wiley-Interscience, New York, 1971, p. 230, we can estimate that $T_m$ of EXP-155 is about 300° F. (422° K). This temperature range covers most applications in drilling fluids.

Circulation of the fluid was found to be an important element of the latex plugging mechanism. This was explored in the tests with EXP-155. As the formulation was only 1.5% latex particles by volume (EXP-155 is 50% active), insufficient latex was available in the mud to produce plugging under static conditions. With circulation, however, the latex accumulated on the surface and formed a plugging film. Standard procedure is to circulate the mud about 7 hours followed by static exposure overnight. Four or five hours without circulation elapses before the test is started in the morning. This static period eliminates pressure drift due to temperature effects by allowing temperature variation from circulation to equilibrium.

Figure 6:
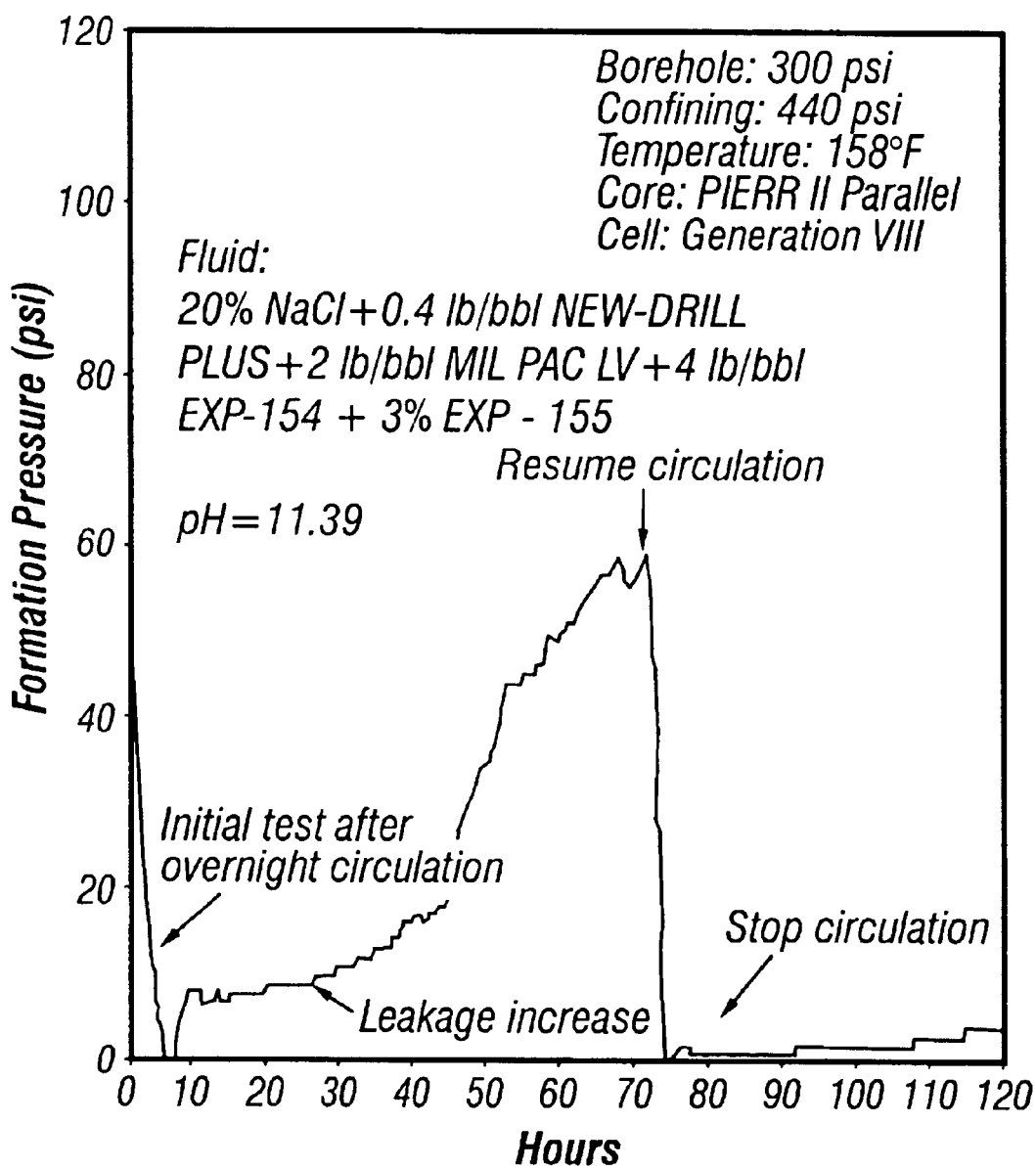
FIG. 6 is a graph showing the effect of circulation on EXP-154/EXP-155 mud performance.

When the test started the formation pressure fell from 50 psi to zero, increasing the differential pressure from 250 to 300 psi, as seen in FIG. 6. In about 30 hours, the plug began to leak and the formation pressure rose. However, additional circulation sealed the leak in an hour and the pressure again fell to zero. In previous tests the circulation was stopped after an hour, and the plug started leaking again after another 30 hours. In this test, circulation was restarted after the pressure rose to 60 psi in 70 hours (FIG. 6). However, circulation was maintained 5 hours instead of one as before. With a few hours of continued circulation after the greater pressure differential was established, the seal was more stable The pressure rose only a few psi in 45 hours.

Photomicrographs of the plug face showed latex accumulation along microfractures in the shale. As the volume and velocity of filtration flow into these cracks is very small, filtration alone cannot account for the latex accumulation at the crack throat. Inside these cracks the clay surface area to filtrate volume ratio is very large resulting in heavy EXP-154 precipitation. The reason may relate to the co-precipitation behavior of EXP-154 and EXP-155 as discussed previous, without being limited to any particular explanation. The precipitation of aluminum complex at pH<19 apparently enhances latex accumulation at the crack throat. When sufficient latex is deposited to bridge the crack opening, the fracture is sealed and differential pressure is established across the latex. The differential pressure consolidates the latex deposit into a solid seal. Increasing the differential pressure apparently causes this seal to deform over time (about 30 hours in the case of the FIG. 6 results) and/or grows additional cracks in the shale and the shale begins to leak, although the inventors do not necessarily want to be limited by this explanation. However, additional circulation rapidly sealed the leaks and reestablished the seal. Circulating after the full differential pressure was reached formed a stable seal with only a small pressure rise.

Effect of Latex on Mud Properties

Figure 7:
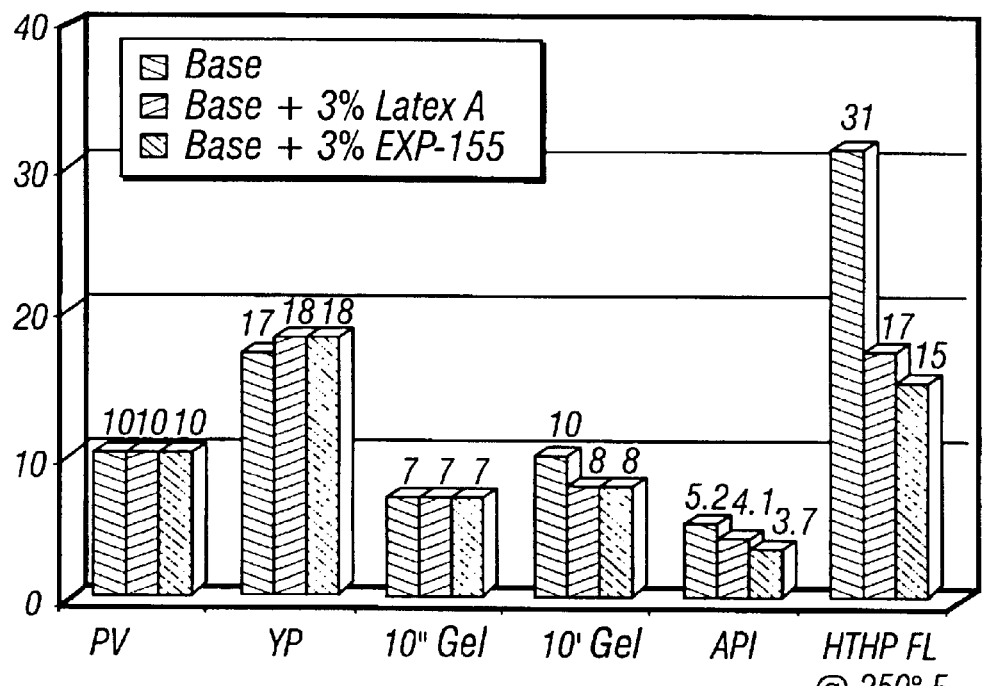
FIG. 7 is a graph showing the effect of latex on mud properties in 9.6 lb/gal 20% NaCl fluid after 16 hours, 250° F. (121° C.) hot roll; the base fluid was 20% NaCl/1 lb/bbl XAN-PLEX D/0.4 lb/bbl NEW-DRILL PLUS/2 lb/bbl BIO-PAQ/5 lb/bbl EXP-154/10 lb/bbl MIL-CARB/27 lb/bbl Rev Dust.
Figure 8:
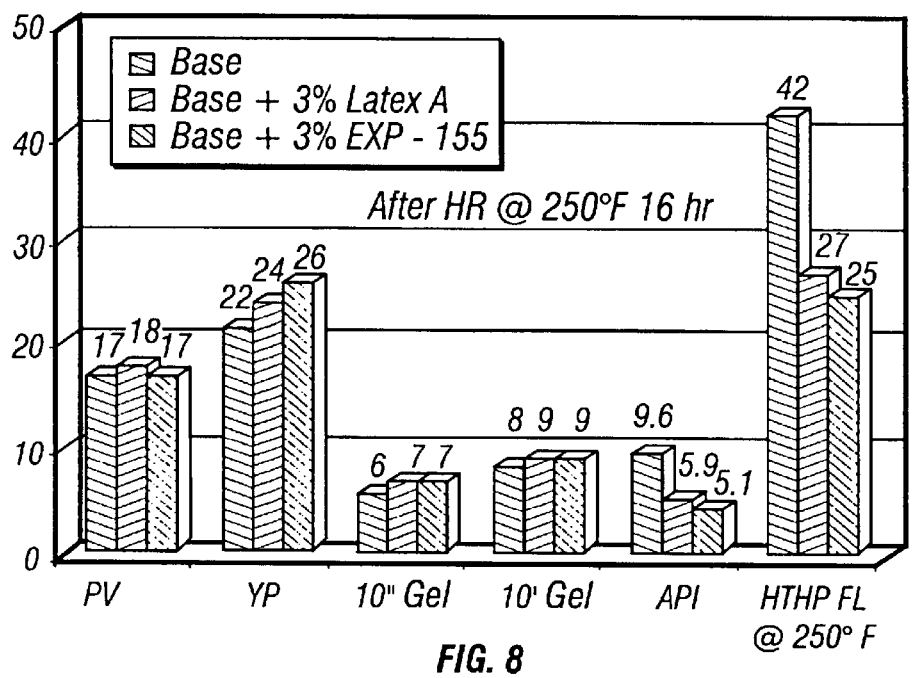
FIG. 8 is a graph showing the effect of latex on mud properties in 12 lb/gal after hot rolling for 16 hours at 250° F. (121° C.); the base fluid was 20% NaCl/0.75 lb/bbl XAN-PLEX D/0.4 lb/bbl NEW-DRILL PLUS/3 lb/bbl BIO-PAQ/5 lb/bbl EXP-154/150 lb/bbl MIL-CARB/27 lb/bbl Rev Dust.

The previous results and discussions deal with latex stability in drilling fluids and its synergy with aluminum complex in improving mud inhabitability to shale formations. Besides, improved performance parameters achieved by the latex products were also recognized. Two latex samples, Latex A (8:1 blended AIRFLEX 728 and EXP-152) and EXP-155 (8:1 blended GENCAL 7463 and EXP-152), were evaluated in 9.6 lb/gal 20% NaCl and 12 lb/gal 20% NaCl fluids. The effects of adding 3% by volume of these latex products are illustrated in FIGS. 7 and 8. Without obvious effect on the fluid rheology, HTHP fluid loss at 250° F. (121° C.) decreased as much as 45% and 52% in 9.6 lb/gal mud and 35% and 40% in 12 lb/gal mud by Latex A and EXP-155, respectively. Again, EXP-155 presents better results that AIRFLEX 728. Additional tests with EXP-155 are listed in Table II.

TABLE II

Typical Performance Parameters of 12 lb/gal 20% NaCl/EXP-155 Fluids

| Formulation Example # | 23 | | | 24 | | |
|---|---|---|---|---|---|---|
| Water, bbl | 0.89 | | | 0.89 | | |
| XAN-PLEX D, lb/bbl | 0.5 | | | 0.5 | | |
| BIO-PAQ, lb/bbl | 4 | | | — | | |
| BIO-LOSE, lb/bbl | — | | | 4 | | |
| NEW DRILL PLUS, lb/bbl | 1 | | | 1 | | |
| EXP-1 54, lb/bbl | 5 | | | 5 | | |
| NaCl, lb/bbl | 77.5 | | | 77.5 | | |
| EXP-1 55, % by vol. | 3 | | | 3 | | |
| MIL-BAR, lb/unweighted bbl | 150 | | | 150 | | |
| Rev-Dust, lb/bbl | 27 | | | 27 | | |
| Initial Properties | | | | | | |
| PV, cP | 22 | | | 21 | | |
| YP, lb/100 ft$^2$ | 26 | | | 20 | | |
| 10 second gel, lb/100 ft$^2$ | 5 | | | 4 | | |
| 10 minute gel, lb/100 ft$^2$ | 10 | | | 8 | | |
| API, cm$^3$/30 min. | 2.5 | | | 1.4 | | |
| pH | 10.6 | | | 10.7 | | |
| Density, lb/gal | 12.2 | | | 12.2 | | |
| after HR 16 hr @ | 150° F. (66° C.) | 250° F. (121° C.) | — | 150° F. (66° C.) | 250° F. (121° C.) | — |
| after static aged 16 hr @ | — | — | 300° F. (149° C.) | — | — | 300°F. (149° C.) |
| PV,cP | 20 | 21 | 22 | 26 | 24 | 23 |
| YP, lb/100 ft$^2$ | 24 | 29 | 34 | 17 | 21 | 22 |
| 10 second gel, lb/100 ft | 6 | 7 | 10 | 4 | 5 | 5 |
| 10 minute gel, lb/100 ft | 9 | 10 | 13 | 7 | 7 | 7 |
| API, ml | 2.8 | 3.7 | 2.8 | 2.2 | 2.6 | 1.8 |
| pH | 10.4 | 9.7 | 9.7 | 10.5 | 9.7 | 10.1 |
| HTHP fluid loss, cm$^3$/30 min. | 9.4 | 16.4 | 12 | 8.4 | 13 | 10.8 |

Toxicity Test

Figure 9:
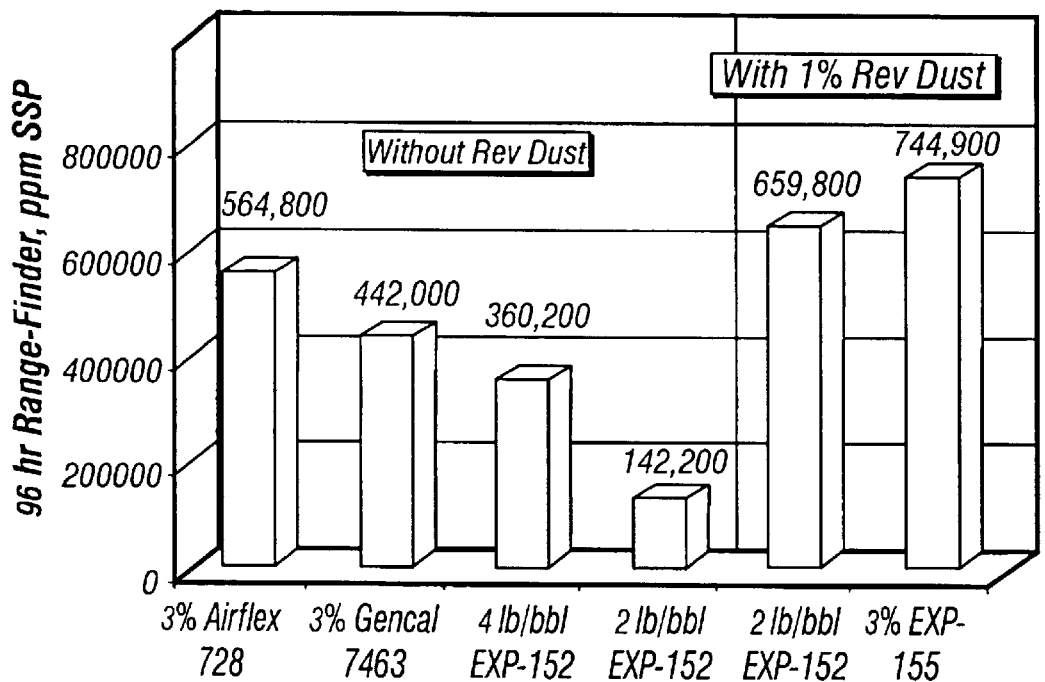
FIG. 9 is a graph of 96 hour Mysidopsis bahia rangefinder results for experimental products in 12 lb/gal fluids where the base fluid is 20% NaCl/0.5 lb/bbl XAN-PLEX D/0.4–1 lb/bbl NEW-DRILL PLUS/2 lb/bbl MIL-PAC LV (or BIO-PAQ)/150 lb/bbl MIL-BAR.

The 96 hour range-finder bioassay results of AIRFLEX 728, GENCAL 7463, EXP-152, EXP-154 and EXP-155 in 12 lb/gal 20% NaCl/NEW-DRILL fluids are presented in FIG. 9. All products meet the requirement for fluid disposal in the Gulf of Mexico (30,000 ppm) and become less toxic after solids contamination.

In the foregoing specification, the invention has been described with reference to specific embodiments thereof, and has been demonstrated as effective in providing a water-based drilling fluid that can effectively reduce the rate of drilling fluid pressure invasion of the borehole wall. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines and latexes and with precipitating agents and/or wetting surfactants or salts falling within the claimed parameters, but not specifically identified or tried in a particular composition to reduce mud pressure penetration into shale formations, are anticipated to be within the scope of this invention.

GLOSSARY

| | |
|---|---|
| 4025-70 | Low molecular weight amphoteric polymer sold by Amoco, found to be ineffective (also abbreviated as 4025). |
| AIRFLEX 728 | A polyvinylacetate latex (more specifically, an ethylenevinyl chloride vinylacetate copolymer) dispersion sold by Air Products. |
| AIRFLEX 426 | Vinyl acetate/ethylene copolymer available from Air Products. |
| AIRFLEX 7200 | Vinyl acetate/ethylene copolymer available from Air Products. |
| ALPLEX ® | Proprietary aluminum complex product available from Baker Hughes INTEQ. |
| AqS | Abbreviation for AQUACOL-S, a glycol available from Baker Hughes INTEQ. |
| BIO-LOSE | Derivatized starch available from Baker Hughes INTEQ. |
| BIOPAQ | Derivatized starch fluid loss additive available from Baker Hughes INTEQ. |
| CARBO-GEL | An amine-treated clay marketed by Baker Hughes INTEQ. |
| CARBO-MUL | Invert emulsion emulsifier marketed by Baker Hughes INTEQ. |
| ELVACE 40722-00 | Vinylacetate/ethylene copolymer latex available from Reichhold. |
| EXP-152 | Oleamidopropyl betaine surfactant. |
| EXP-153 | Sulfonated polymer resin (or sulfonated humic acid with resin) available from Baker Hughes INTEQ. |
| EXP-154 | A mixture of 45% NaAlO$_2$, 45% EXP-153 and 10% sodium D-gluconate. |
| EXP-155 | An 8:1 volume blend of GENCAL 7463 and EXP-152. |
| FLOWZAN | Biopolymer available from Drilling Specialties. |
| FT-1 A | SULFATROL, 90% water-soluble sulfated asphalt dispersion sold by Baker Hughes INTEQ. |
| GENCAL 7463 | Carboxylated styrene/butadiene available from Omnova Solution Inc. |
| GENCAL 7470 | Carboxylated styrene/butadiene available from Omnova Solution Inc. |
| GENFLO 576 | Available from Omnova Solution Inc. |
| LD8 | A commercial defoamer available from Baker Hughes INTEQ. |

GLOSSARY

| | |
|---|---|
| LIGCO | Lignite sold by Baker Hughes INTEQ. |
| MIL-BAR | Barite weighting agent available from Baker Hughes INTEQ. |
| MIL-CARB | Calcium carbonate weighting agent available from Baker Hughes INTEQ. |
| MILPAC LV | Low viscosity polyamine cellulose available from Baker Hughes INTEQ (sometimes abbreviated as PacLV). |
| NEWDRILL PLUS | Partially hydrolyzed polyacrylamide available from Baker Hughes INTEQ. |
| ROVENE 4823L | Styrene/butadiene copolymer available from Mallard Creek. |
| ROVENE 6140 | Carboxylated styrene/butadiene available from Mallard Creek. |
| ROVENE 9410 | Carboxylated styrene/butadiene available from Mallard Creek. |
| SA | Abbreviation for sodium aluminate. |
| SYNTHEMUL 97982 | Carboxylated acrylic copolymer available from Reichhold. |
| SYNTHEMUL CPS 401 | Carboxylated acrylic copolymer available from Reichhold. |
| TYCHEM 68710 | Carboxylated styrene/butadiene copolymer available from Reichhold. |
| TYLAC 68219 | Carboxylated styrene/butadiene copolymer available from Reichhold. |
| TYLAC CPS 812 | Carboxylated styrene/butadiene copolymer available from Reichhold. |
| VINAC XX-211 | Vinyl acetate/ethylene copolymer available Air Products. |
| XAN-PLEX D | Biopolymer available from Baker Hughes INTEQ. |

We claim:

1. A water-based drilling fluid comprising:
    a) a polymer latex capable of providing a deformable latex film on at least a portion of a subterranean formation;
    b) water;
    c) at least one precipitating agent selected from the group consisting of aluminum complexes; and
    d) salt present in an amount of from about 1 wt. % to about saturation based on the total water-based drilling fluid.

2. The water-based drilling fluid of claim 1 where the precipitating agent further comprises a silicate.

3. A water-based drilling fluid comprising:
    a) a polymer latex;
    b) a precipitating agent; and
    c) a saturated salt brine.

4. The water-based drilling fluid of claim 3 further comprising a surfactant.

5. A water-based drilling fluid comprising:
    a) a polymer latex capable of providing a deformable latex film on at least a portion of a subterranean formation;
    b) a precipitating agent selected from the group consisting of aluminum complexes;
    c) a surfactant;
    d) water; and
    e) salt present in an amount of from about 1 wt. % to about saturation based on the total water-based drilling fluid.

6. The water-based drilling fluid of claim 5 where the salt is selected from the group consisting of calcium chloride, sodium chloride, potassium chloride, magnesium chloride, calcium bromide, sodium bromide, potassium bromide, calcium nitrate, sodium formate, potassium formate, cesium formate, and mixtures thereof.

7. The water-based drilling fluid of claim 5 where the polymer latex is capable of providing a deformable latex seal on at least a portion of a subterranean formation and is selected from the group consisting of polymethyl methacrylate, polyethylene, carboxylated styrene/butadiene copolymer, polyvinylacetate copolymer, polyvinyl acetate/vinyl chloride/ethylene copolymer, polyvinyl acetate/ethylene copolymer, natural latex, polyisoprene, polydimethylsiloxane, and mixtures thereof.

8. The water-based drilling fluid of claim 5 where the precipitating agent further comprises a silicate.

9. The water-based drilling fluid of claim 5 where the polymer latex is present in the drilling fluid in an amount of from about 0.1 to about 10 volume % based on the total water-based drilling fluid.

10. The water-based drilling fluid of claim 5 where the precipitating agent is present in the drilling fluid in an amount of from about 0.25 to about 20 lb/bbl based on the total water-based drilling fluid.

11. The water-based drilling fluid of claim 5 where the surfactant is present in the drilling fluid in an amount of from about 0.005 to about 2 wt. % based on the total water-based drilling fluid.

12. The water-based drilling fluid of claim 5 where polymer latex comprises particles that average less than 1 micron in size.

13. A water-based drilling fluid comprising:
    a) from about 1 to about 10 volume % of a polymer latex selected from the group consisting of polymethyl methacrylate, polyethylene, carboxylated styrene/butadiene copolymer, polyvinylacetate copolymer, polyvinyl acetate/vinyl chloride/ethylene copolymer, polyvinyl acetate/ethylene copolymer, natural latex, polyisoprene, polydimethylsiloxane, and mixtures thereof;
    b) from about 0.25 to about 20 lb/bbl of a precipitating agent selected from the group consisting of silicates, aluminum complexes, and mixtures thereof;
    c) at least 1 wt. % of a salt selected from the group consisting of calcium chloride, sodium chloride, potassium chloride, magnesium chloride, calcium bromide, sodium bromide, potassium bromide, calcium nitrate, sodium formate, potassium formate, cesium formate, and mixtures thereof;
    d) from about 0.005 to about 2 vol. % of a surfactant selected from the group consisting of betaines, alkali metal alkylene acetates, sultaines, ether carboxylates, and mixtures thereof; and
    e) water making up the balance,
    where the proportions are based on the total water-based drilling fluid.

14. A method of inhibiting borehole wall invasion when drilling with a water-based drilling fluid in a subterranean formation, the method comprising:
    a) providing a water-based drilling fluid comprising:
        i) a polymer latex capable of providing a deformable latex seal on at least a portion of a subterranean formation;
        ii) water; and
        iii) at least one precipitating agent selected from the group consisting of aluminum complexes; and
    b) circulating the water-based drilling fluid in contact with a borehole wall.

15. The method of claim 14 where in providing the water-based drilling fluid, the water comprises salt.

16. The method of claim 14 where in providing the water-based drilling fluid, the precipitating agent further comprises a silicate.

17. The method of claim 14 where in providing the water-based drilling fluid, the fluid further comprises a surfactant.

18. A method of inhibiting borehole wall invasion when drilling with a water-based drilling fluid in a subterranean formation, the method comprising:
   a) providing a water-based drilling fluid comprising:
      i) a polymer latex;
      ii) a precipitating agent selected from the group consisting of aluminum complexes; and
      iii) water; and
   b) circulating the water-based drilling fluid in contact with a borehole wall.

19. The method of claim 18 where in providing the water-based drilling fluid, the water comprises salt and is a saturated salt brine.

20. The method of claim 18 where in providing the water-based drilling fluid, the water-based drilling fluid further comprises a surfactant.

21. A method of inhibiting borehole wall invasion when drilling with a water-based drilling fluid in a subterranean formation, the method comprising:
   a) providing a water-based drilling fluid comprising:
      i) a polymer latex;
      ii) a precipitating agent selected from the group consisting of aluminum complexes;
      iii) a surfactant; and
      iv) water; and
   b) circulating the water-based drilling fluid in contact with a borehole wall.

22. The method of claim 21 where in providing the water-based drilling fluid, the water comprises salt.

23. The method of claim 22 where the salt is selected from the group consisting of calcium chloride, sodium chloride, potassium chloride, magnesium chloride, calcium bromide, sodium bromide, potassium bromide, calcium nitrate, sodium formate, potassium formate, cesium formate, and mixtures thereof.

24. The method of claim 21 where in providing the water-based drilling fluid, the polymer latex is capable of providing a deformable latex seal on at least a portion of a subterranean formation and is selected from the group consisting of polymethyl methacrylate, polyethylene, carboxylated styrene/butadiene copolymer, polyvinylacetate copolymer, polyvinyl acetate/vinyl chloride/ethylene copolymer, polyvinyl acetate/ethylene copolymer, natural latex, polyisoprene, polydimethylsiloxane, and mixtures thereof.

25. The method of claim 21 where in providing the water-based drilling fluid, the precipitating agent further comprises a silicate.

26. The method of claim 21 where in providing the water-based drilling fluid, the polymer latex is present in the drilling fluid in an amount of from about 0.1 to about 10 vol. % based on the total water-based drilling fluid.

27. The method of claim 21 where in providing the water-based drilling fluid, the precipitating agent is present in the drilling fluid in an amount of from about 0.25 to about 20 lb/bbl based on the total water-based drilling fluid.

28. The method of claim 21 where in providing the water-based drilling fluid, the surfactant is present in the drilling fluid in an amount of from about 0.005 to about 2 vol. % based on the total water-based drilling fluid.

29. The method of claim 22 where the salt is present in the drilling fluid in an amount of from about 1 wt. % to about saturation based on the total water-based drilling fluid.

30. The method of claim 21 where in providing the water-based drilling fluid, the polymer latex comprises particles that average less than 1 micron in size.

31. A method of inhibiting borehole wall invasion when drilling with a water-based drilling fluid in a subterranean formation, the method comprising:
   a) providing a water-based drilling fluid comprising:
      i) from about 0.1 to about 10 vol. % of a polymer latex selected from the group consisting of polymethyl methacrylate, polyethylene, carboxylated styrene/butadiene copolymer, polyvinylacetate copolymer, polyvinyl acetate/vinyl chloride/ethylene copolymer, polyvinyl acetate/ethylene copolymer, natural latex, polyisoprene, polydimethylsiloxane, and mixtures thereof;
      ii) from about 0.25 to about 20 lb/bbl of a precipitating agent selected from the group consisting of silicates, aluminum complexes, and mixtures thereof;
      iii) at least 1 wt. % of a salt selected from the group consisting of calcium chloride, sodium chloride, potassium chloride, magnesium chloride, calcium bromide, sodium bromide, potassium bromide, calcium nitrate, sodium formate, potassium formate, cesium formate, and mixtures thereof;
      iv) from about 0.005 to about 2 vol. % of a surfactant selected from the group consisting of betaines, alkali metal alkylene acetates, sultaines, ether carboxylates, and mixtures thereof; and
      v) water making up the balance,
   where the proportions are based on the total water-based drilling fluid; and
   b) circulating the water-based drilling fluid in contact with a borehole wall.

32. A water-based drilling fluid comprising:
   a) a polymer latex;
   b) a precipitating agent;
   c) a surfactant, where the surfactant is selected from the group consisting of betaines, alkali metal alkylene acetates, sultaines, ether carboxylates, and mixtures thereof; and
   d) water.

33. A method of inhibiting borehole wall invasion when drilling with a water-based drilling fluid in a subterranean formation, the method comprising:
   a) providing a water-based drilling fluid comprising:
      i) a polymer latex;
      ii) a precipitating agent;
      iii) a surfactant, where the surfactant is selected from the group consisting of betaines, alkali metal alkylene acetates, sultaines, ether carboxylates, and mixtures thereof; and
      iv) water; and
   b) circulating the water-based drilling fluid in contact with a borehole wall.

* * * * *

UNITED STATES PATENT AND TRADEMARK OFFICE
CERTIFICATE OF CORRECTION

PATENT NO. : 6,703,351 B2
DATED : March 9, 2004
INVENTOR(S) : Calvin Joseph Stowe, II et al.

It is certified that error appears in the above-identified patent and that said Letters Patent is hereby corrected as shown below:

Column 12,
Line 38, please delete "pH <19" and insert -- pH <9 --.

Signed and Sealed this

Ninth Day of November, 2004

JON W. DUDAS
*Director of the United States Patent and Trademark Office*